United States Patent
Lewis et al.

(10) Patent No.: US 6,184,636 B1
(45) Date of Patent: Feb. 6, 2001

(54) MOTOR CONTROL

(75) Inventors: Jason Lewis, Christchurch; Dev Kumar Banerjee, Southampton, both of (GB)

(73) Assignee: Penny & Giles Drives Technology Limited, Dorset (GB)

(*) Notice: Under 35 U.S.C. 154(b), the term of this patent shall be extended for 0 days.

(21) Appl. No.: 09/438,034

(22) Filed: Nov. 10, 1999

(30) Foreign Application Priority Data

Apr. 14, 1999 (GB) .................................................. 9908409

(51) Int. Cl.⁷ ...................................................... H02P 7/06
(52) U.S. Cl. ............................ 318/254; 318/138; 318/439
(58) Field of Search .................... 318/254, 138, 318/439, 799

(56) References Cited

U.S. PATENT DOCUMENTS

| | | | |
|---|---|---|---|
| 5,530,326 | 6/1996 | Galvin et al. | 318/254 |
| 5,534,763 * | 7/1996 | Williams et al. | 318/799 |
| 5,569,989 | 10/1996 | Acquaviva | 318/254 |
| 5,574,342 | 11/1996 | Okamoto | 318/254 |
| 5,717,297 | 2/1998 | Karwath et al. | 318/254 |
| 5,717,298 | 2/1998 | Tang et al. | 318/254 |
| 5,739,650 | 4/1998 | Kimura et al. | 318/254 |
| 5,767,639 | 6/1998 | Sakaguchi et al. | 318/254 |
| 5,773,941 | 6/1998 | Moritz et al. | 318/254 |
| 5,838,123 | 11/1998 | Zhao | 318/254 |
| 5,929,577 * | 7/1999 | Neidorff et al. | 318/254 |
| 5,986,419 * | 11/1999 | Archer et al. | 318/254 |
| 6,034,493 * | 3/2000 | Boyd et al. | 318/254 |

FOREIGN PATENT DOCUMENTS

| | | |
|---|---|---|
| 0189675B1 | 4/1991 | (EP) . |
| 0716499A1 | 6/1996 | (EP) . |
| WO91/12652 | 2/1991 | (WO) . |
| WO97/50171 | 12/1997 | (WO) . |

\* cited by examiner

*Primary Examiner*—Robert E. Nappi
*Assistant Examiner*—Rita Leykin
(74) *Attorney, Agent, or Firm*—David P. Gordon; David S. Jacobson; Thomas A Gallagher

(57) ABSTRACT

A control system current (DC) motor in which driving signals are supplied to the stator windings of the motor in accordance with a measurement of the rotational speed of the motor and the position of the rotor of the motor. The speed measurement is obtained by combining a first signal representing the rotational speed of the motor derived from a measurement of the back-EMF developed in the stator windings of the motor and a second signal representing the rotational speed of the motor derived from the output of a sensor which senses the position of the rotor of the motor.

9 Claims, 3 Drawing Sheets

MOTOR CONTROL

FIELD OF THE INVENTION

The present invention relates to a control system for driving a brushless direct current (DC) motor.

BACKGROUND OF THE INVENTION

Brushless DC motors are now commonplace and are typically driven by signals supplied to the stator windings of the motor in accordance with the outputs of one or more Hall-effect sensors which detect the alignment therewith of the rotor poles of the motor.

Thus the requirement for brushes to effect commutation of the driving signals is obviated.

However, at low rotation speeds, smooth and stable control of the motor becomes difficult due the substantial time delays between successive changes of state of the Hall-effect sensor outputs.

We have now devised an arrangement which overcomes the limitations of existing control systems for driving DC brushless motors.

In accordance with the present invention, there is provided a control system for driving a brushless direct current (DC) motor, the control system comprising means for providing a measurement of the rotational speed of the motor by combining a first signal representing the rotational speed of the motor derived from a measurement of the back-EMF developed in the stator windings of the motor and a second signal representing the rotational speed of the motor derived from the output of means which sense the position of the rotor of the motor, such that as the rotational speed of the motor is increased from a first rotational speed to a second rotational speed, the combined speed measurement is determined to a greater extent by said second speed signal and to a lesser extent by said first speed signal, and means for supplying driving signals to the stator windings in accordance with the combined speed measurement and the position of the rotor of the motor.

Preferably at said first rotational speed the combined speed measurement is determined from said first speed signal only and preferably at said second rotational speed the combined speed measurement is determined from said second speed signal only.

Whilst the respective proportional contributions made to the combined speed measurement by each of said first and second speed signals may vary in one or more discrete steps between said first and second speeds, the respective proportional contributions preferably vary continuously with increasing or decreasing motor speed, thereby avoiding any abrupt transitions in the combined speed measurement.

Most preferably, within a region between said first and second speeds, the respective proportional contributions made to the combined speed measurement by each of said first and second speed signals vary linearly with respect to one another.

Preferably the position sensing means comprise one or more position sensing transducers. Most preferably the or each position sensing transducer comprises a Hall-effect sensor for detecting the alignment therewith of each of the rotor poles.

Also in accordance with the present invention, there is provided a method of driving a brushless direct current (DC) motor, wherein driving signals are supplied to the stator windings of the motor in accordance with a measurement of the rotational speed of the motor and the position of the rotor of the motor, the combined speed measurement being determined by combining a first signal representing the rotational speed of the motor derived from a measure of the back-EMF developed in the stator windings and a second signal representing the rotational speed of the motor derived from the output of means which sense the position of the rotor of the motor, such that as the rotational speed of the motor is increased from a first rotational speed to a second rotational speed, the combined speed measurement is determined to a greater extent by said second speed signal and to a lesser extent by said first speed signal.

An embodiment of the present invention will now be described by way of an example only and with reference to the accompanying drawings.

DETAILED DESCRIPTION OF THE DRAWINGS

Figure 1:
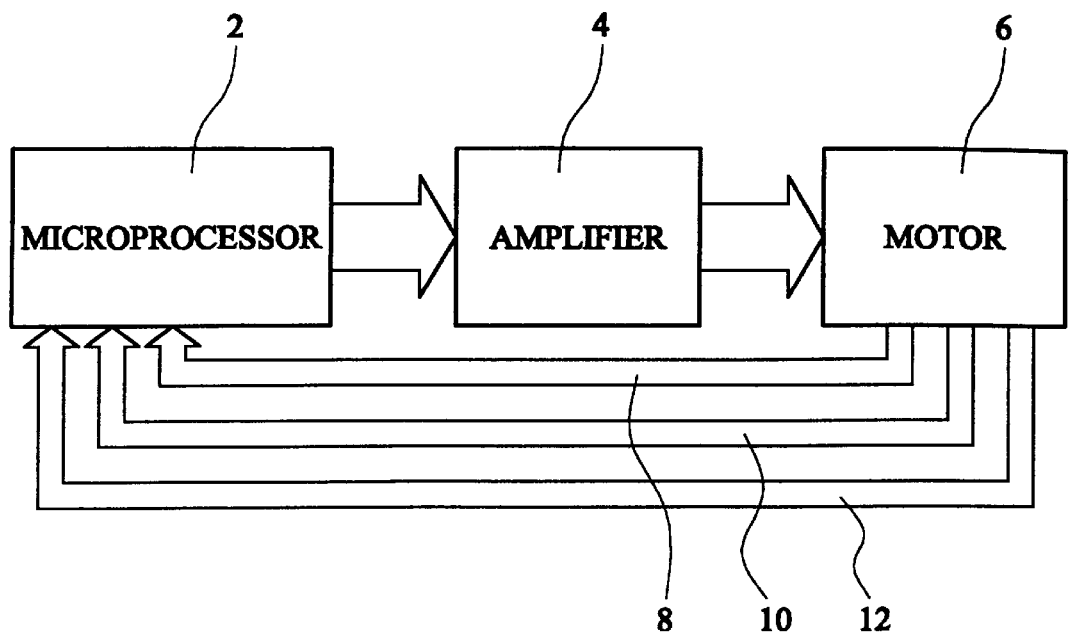
FIG. 1 is a schematic diagram of a prior art control system connected to a DC brushless motor.

Referring to FIG. 1 of the drawings, a prior art control system is shown comprising a microprocessor 2 for controlling the output of an FET based switching amplifier 4 which applies a high frequency switched voltage signal to the stator windings of a three phase permanent magnet brushless DC motor 6.

Voltage is applied to each of the stator windings in turn, in accordance with the outputs 8,10,12 of three Hall-effect sensor transducers, mounted around the rotor, which sense passing magnetic fields produced by permanent magnets on the rotating rotor. The three sensors are mounted such that two of the sensors are mounted equidistantly from, and on either side of, the third sensor.

The outputs 8,10,12 of the Hall-effect sensors are used to synchronise the energising of respective stator windings by the switching amplifier to maintain a substantially constant phase relationship between the rotor flux and the stator flux, thereby maximising the torque of the motor.

To vary the speed of the motor, the voltage applied to the stator windings is pulse width modulated using a signal representing the speed of the motor determined by measuring the time taken between successive changes of state of the Hall-effect sensor outputs. However, at low rotation speeds, the substantial time delays between successive Hall-effect sensor outputs mean that a signal accurately representing the present speed of the motor is difficult to obtain.

Figure 2:
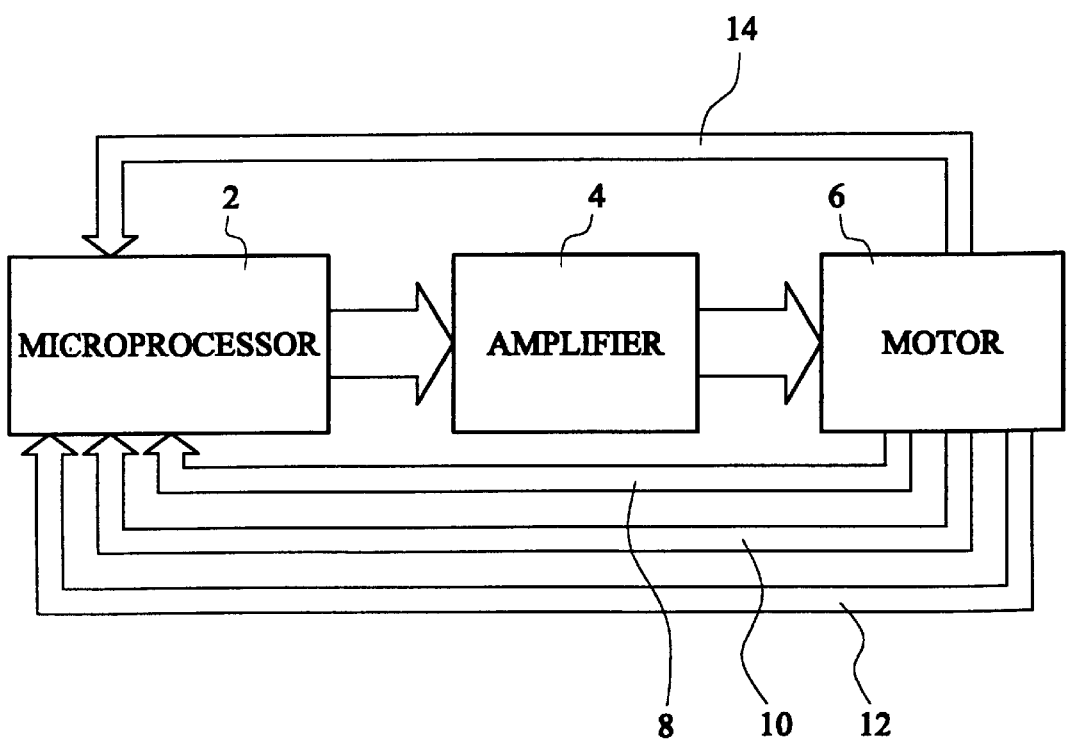
FIG. 2 is a schematic diagram of a control system in accordance with the present invention connected to a DC brushless motor.

The above problem is overcome by the control system in accordance with the present invention, an embodiment of which is shown in FIG. 2. The control system shown in FIG. 2 corresponds to that shown in FIG. 1 and like parts are given like reference numerals. In addition, the control system of FIG. 2 is arranged to derive a measurement the speed of the motor from a measurement 14 of the back-EMF developed in the stator windings. At low rotational speeds, this signal provides a substantially more reliable representation of the speed of the motor than that derived from the Hall-effect sensor outputs.

The measurement of the back-EMF developed in the stator windings is preferably obtained using known means which measure the voltage V applied to each winding in turn and the resulting steady-state current I flowing through that winding, the back-EMF being equal to V-IR, where R is the resistance of the winding.

In the control system of FIG. 2, driving signals are applied to the stator windings of the motor 6 in accordance with a measurement of the rotational speed of the motor: this measurement is derived by combining a first signal derived from the measurement 14 of the back-EMF developed in the stator windings, and a second signal derived from the outputs 8,10,12 of the Hall-effect sensors, the first and second signals being combined such that as the rotational speed of the motor is increased from a first rotational speed to a second rotational speed, the combined speed measurement is determined to a greater extent by the second speed signal and to a lesser extent by the first speed signal.

In the calculation of the combined speed measurement, respective weightings $Wf_1, Wf_2$ are applied to the first and second signals, over a range of rotational speeds including a first speed $N_1$ and a second speed $N_2$ subject to the following conditions, $$Wf_2 = 1 - Wf_1$$

Figure 3:
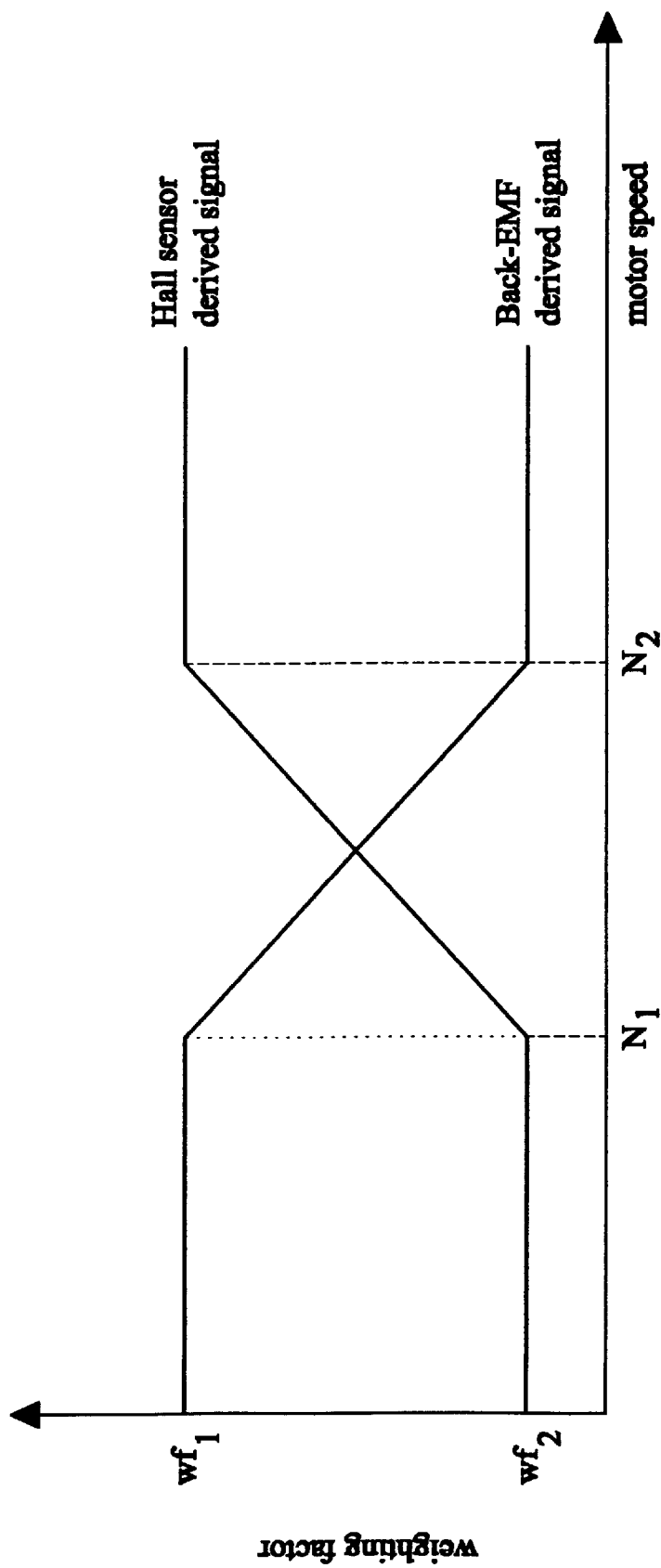
FIG. 3 is a graph showing the variation in the proportional contribution made by each of two signals to a combined measurement of the speed of the motor, over a range of motor speeds, according to a first preferred weighting scheme.
Figure 4:
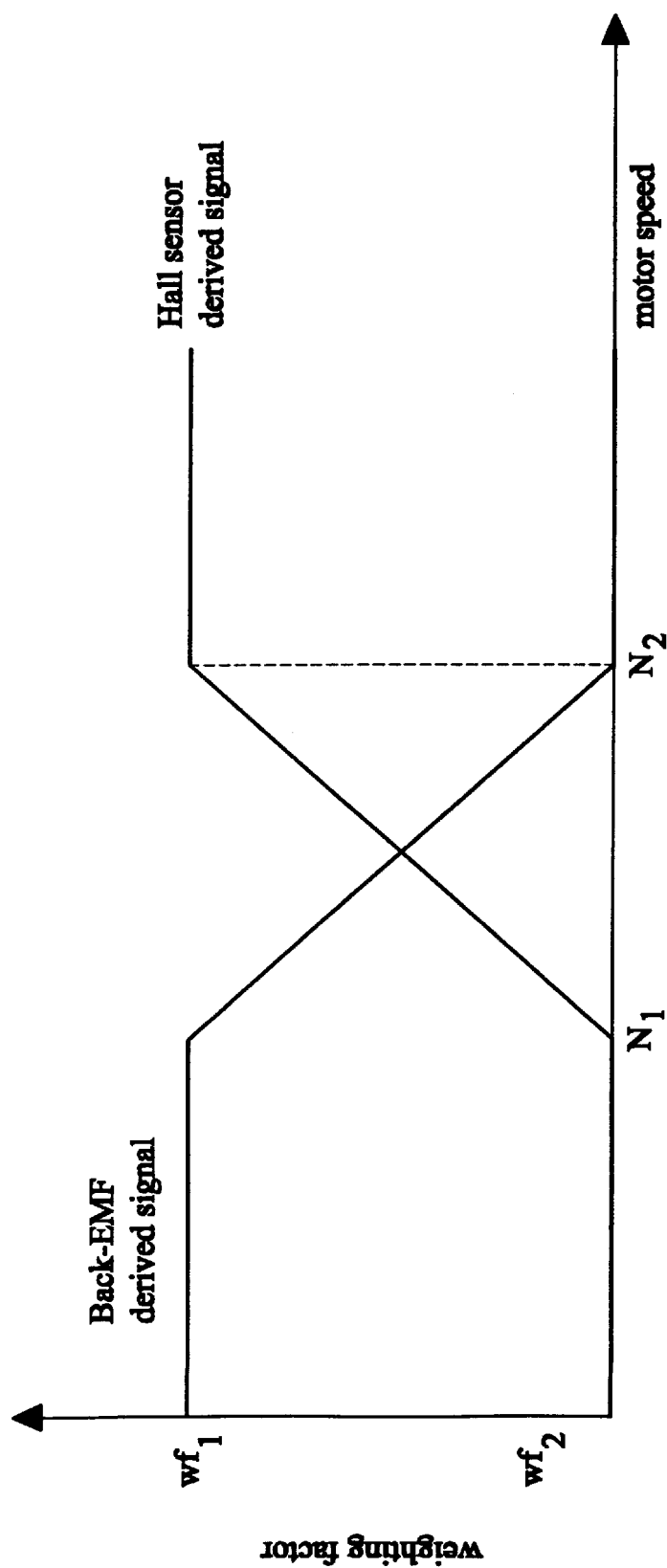
FIG. 4 is a graph showing the variation in the proportional contribution made by each of two signals to a combined measurement of the speed of the motor, over a range of motor speeds, according to a second preferred weighting scheme.

$N_1 >= 0$
$N_2 >= N_1$
if $N_1 = 0$ then $N_2 > 0$
and
for $N < N_1$, $0 < Wf_1 <= 1$ and $Wf_1 > f_2$
for $N > N_2$, $0 <= Wf_1 < 1$ and $Wf_1 < Wf_2$
for $N_1 <= N <= N_2$, $0 <= Wf_1 <= 1$ FIG. 3 shows a first preferred weighting scheme, wherein.
$N_1 > 0$
$N_2 > N_1$
and
for $N < N_1$, $Wf_1 < 1$
for $N > N_2$, $Wf_1 > 0$ FIG. 4 shows a second preferred weighting scheme, wherein.
$N_1 > 0$
$N_2 > N_1$
and
for $N < N_1$, $Wf_1 = 1$
for $N > N_2$, $Wf_1 = 0$ In each of the two embodiments illustrated, for rotational speeds less than $N_1$ or greater than $N_2$, the respective weightings applied to the first and second speed signals are substantially constant. Also, the respective weightings $Wf_1$ and $Wf_2$ vary linearly between $N_1$ and $N_2$, thereby avoiding any abrupt transition in the value of the combined speed measurement. However, it will be appreciated that for ease of implementation, $Wf_1$ and $Wf_2$ may instead vary in one or more discrete steps between $N_1$ and $N_2$.

The arrangement thus described overcomes the low speed limitations of existing brushless dc motor controllers whose driving signals are determined by rotor-position feedback devices alone.

What is claimed is:

1. A control system for driving a brushless direct current (DC) motor, the control system comprising:
   a) means for providing a measurement of a rotational speed of the motor by combining a first signal representing the rotational speed of the motor derived from a measurement of a back-EMF developed in stator windings of the motor and a second signal representing the rotational speed of the motor derived from an output of means which senses a position of the rotor of the motor, such that as the rotational speed of the motor is increased from a first rotational speed to a second rotational speed, a combined speed measurement is determined to a greater extent by said second signal and to a lesser extent by said first signal; and
   b) means for supplying driving signals to the stator windings in accordance with the combined speed measurement and the position of the rotor of the motor.

2. A control system as claimed in claim 1, wherein at said first rotational speed the combined speed measurement is determined from said first speed signal only.

3. A control system as claimed in claim 1, wherein at said second rotational speed the combined speed measurement is determined from said second speed signal only.

4. A control system as claimed in claim 1, wherein between said first and second rotational speeds the respective proportional contributions made to the combined speed measurement by each of said first and second speed signals vary continuously with increasing and decreasing motor speed.

5. A control system as claimed in claim 4, wherein between said first and second rotational speeds the respective proportional contributions made to the combined speed measurement by each of said first and second speed signals vary linearly with respect to one another.

6. A control system as claimed in claim 1, wherein the position sensing means comprise at least one position sensing transducer.

7. A control system as claimed in claim 6, wherein said rotor includes a plurality of rotor poles, and said at least one position sensing transducer comprises a Hall-effect sensor for detecting the alignment therewith of each of the rotor poles.

8. A method of driving a brushless direct current (DC) motor, wherein driving signals are supplied to stator windings of the motor in accordance with a measurement of a rotational speed of the motor and a position of a rotor of the motor, a combined speed measurement being determined by combining a first signal representing the rotational speed of the motor derived from a measure of a back-EMF developed in the stator windings and a second signal representing the rotational speed of the motor derived from an output of means which sense the position of the rotor of the motor, such that as the rotational speed of the motor is increased from a first rotational speed to a second rotational speed, the combined speed measurement is determined to a greater extent by said second signal and to a lesser extent by said first signal.

9. A brushless direct current (DC) motor driven by a control system, the control system comprising:
   a) means for providing a measurement of a rotational speed of the motor by combining a first signal representing the rotational speed of the motor derived from a measurement of a back-EMF developed in stator windings of the motor and a second signal representing the rotational speed of the motor derived from an output of means which senses a position of a rotor of the motor, such that as the rotational speed of the motor is increased from a first rotational speed to a second rotational speed, a combined speed measurement is determined to a greater extent by said second signal and to a lesser extent by said first signal; and b) means for supplying driving signals to the stator windings in accordance with the combined speed measurement and the position of the rotor of the motor.

* * * * *